June 3, 1930.   G. A. BOESGER   1,761,174

AUTOMATIC AIR ESCAPE VALVE FOR SAND BLAST PRESSURE TANKS

Filed April 11, 1927

INVENTOR.

George A. Boesger.
BY
Fay, Oberlin & Fay
ATTORNEYS.

Patented June 3, 1930

1,761,174

UNITED STATES PATENT OFFICE

GEORGE A. BOESGER, OF CLEVELAND, OHIO, ASSIGNOR TO THE W. W. SLY MANUFACTURING COMPANY, OF CLEVELAND, OHIO, A CORPORATION OF OHIO

AUTOMATIC AIR-ESCAPE VALVE FOR SAND-BLAST PRESSURE TANKS

Application filed April 11, 1927. Serial No. 182,758.

The present invention relates to an automatic release valve for use with sand blast pressure tanks. The present valve is placed adjacent the usual main operating valve for the pressure tank and is arranged to work in conjunction therewith to provide an air outlet opening for the tank when the main valve is operated to release the tank pressure. By use of this valve the abrasive laden air from the tank is by-passed to the atmosphere without passing through the main valve, thus eliminating wear on the main valve parts. To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
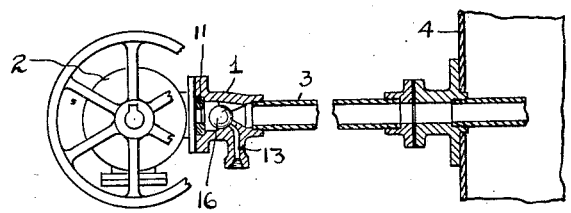
Figure 2:
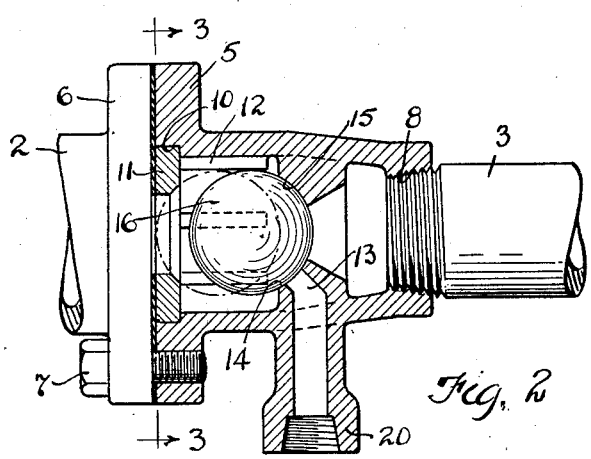
Figure 3:
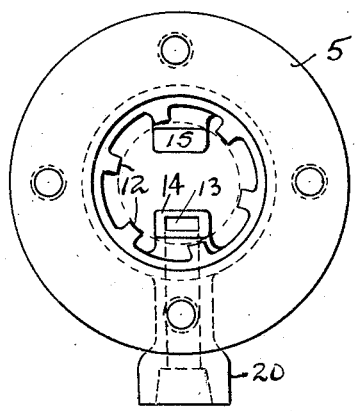

In said annexed drawing:

Fig. 1 is a vertical longitudinal view, partially in section, showing the arrangement of the main valve, automatic release valve and pressure tank; Fig. 2 is a vertical longitudinal section through the automatic valve; and Fig. 3 is an end elevational view of the valve on the line 3—3 of Fig 2, the seat member 11 having been removed.

The present valve mechanism consists of a casing 1, connected at one side to the casing of the main valve 2 and at the other end to the air pipe 3 leading to the pressure tank 4. The valve proper consists of the hollow casing 1 having a connecting flange 5 at one end which is secured to a complementary flange 6 on the main valve housing 2 by cap screws 7 or the like, and at the other end the casing is interiorly threaded as at 8 to receive the air pipe 3.

The casing has an enlarged bore 10 at the main valve end to receive a removably mounted valve seat member 11 and the bore of the casing has a plurality of spaced guide ribs 12. Formed integrally with the casing beyond the ribs is the air-escape pipe 13 terminating in a curved seat opening 14 opposite to which is a false seat 15. The lower extending end 20 of the air escape pipe is preferably interiorly threaded to provide a connection for an additional length of escape pipe. The valve member is a ball 16 preferably of rubber which fits loosely in the guide ribs 12 and which is adapted to seat against the removable valve seat 11 to open the air pipe 13 or to seat on the end 14 of the air pipe and the false seat 15 to close the former, but to allow free passage of air around the ball valve from the main valve to the air pipe.

In the operation of the valve, when the main valve is opened to permit air to enter the pressure tank the ball is moved to the position shown in full lines in Fig. 2 closing the air release pipe 13 but allowing the air to pass around the ball to enter the air pipe and the pressure tank. When the main valve is turned to the pressure release position, the air pressure on the main valve side of the ball is suddenly lowered and the pressure remaining in the tank is sufficient to force the ball by impact to its position shown in dotted lines in Fig. 2, where it seals the passage to the main valve and opens the release pipe 13.

In using the present type of valve, it is found advisable to place the same close to the main valve and the main valve release opening so as to obtain a sudden pressure drop on this side of the valve ball as its movement to its releasing position depends largely on the impact action of the air in the pressure tank.

The use of the present valve by-passes the abrasive laden air to the atmosphere and eliminates its passage through the main valve where it cuts the parts badly. The valve ball must be easily movable as the pressure in the tank is low at the time the pressure is cut off for refilling the tank, and there is, of course, an open air passage around the ball from the air pipe to the main valve casing. By placing the valve close to the main valve release it has been found possible to obtain a sufficient pressure drop on the main valve side of the ball to allow the tank air to jump the ball to its main valve closing position.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In sand blast tank mechanism, the combination of a pressure tank, a main valve for controlling the pressure in said tank, a connecting air pipe from said valve to said tank, and an automatic release valve mounted in said air pipe and provided with an air escape opening to the atmosphere, said valve being adapted to open said air escape automatically upon movement of said main valve to its tank pressure releasing position.

2. In sand blast tank mechanism, the combination of a pressure tank, a main valve for controlling the pressure in said tank, a connecting air pipe from said valve to said tank, and an automatic release valve mounted in said air pipe and provided with an air escape opening to the atmosphere, said valve being adapted to open said air escape automatically upon movement of said main valve to its tank pressure releasing position and to close said air escape opening upon movement of said main valve to its pressure supplying position.

3. An automatic escape valve for sand blast tanks consisting of a valve casing adapted to be connected between the main control valve and the pressure tank, said casing having an air escape port and being provided with a valve ball adapted to normally seal such port and movable away therefrom, such opening movement being automatic upon movement of the main control valve to tank pressure releasing position.

4. An automatic escape valve for sand blast tanks consisting of a valve casing adapted to be connected between the main control valve and the pressure tank, said casing having an air escape port and being provided with a rubber valve ball adapted to normally seal such port and movable away therefrom, such opening movement being automatic upon movement of the main control valve to tank pressure releasing position.

5. An automatic escape valve for sand blast tanks consisting of a valve casing adapted to be connected between the main control valve and the pressure tank, said casing having an air escape port at its end adjacent the pressure tank and a valve seat at the other end, a rubber valve ball mounted in said casing and normally closing said escape port, said ball being maintained in such position by the air stream passing through said casing and being adapted to be automatically moved against said valve seat when said main valve is moved to its pressure release position, such movement being accomplished by a rapid drop in pressure on the main valve side of said ball and by the impact of the outward rush of air from said pressure tank when the pressure is released.

6. In an automatic air escape valve for sand blast tanks, the combination of a hollow body member having a pair of oppositely disposed openings and a series of guide ribs formed interiorly, an air escape pipe formed integrally with said body and having its inner opening extending into one end of said body, and formed as a valve seat, a complementary false valve seat mounted in said body opposite said escape pipe opening, a second valve seat mounted in said valve body at the opposite end, and a valve ball mounted in said body and adapted in one position to rest on said air escape pipe and false seat to seal the former and adapted in its other position to close said other valve seat and open said air escape pipe.

7. In an automatic air escape valve for sand blast tanks, the combination of a hollow body member having a pair of oppositely disposed openings and a series of guide ribs formed interiorly, an air escape pipe formed integrally with said body and having its inner opening extending into one end of said body and formed as a valve seat, a complementary false valve seat mounted in said body opposite said escape pipe opening, a second valve seat mounted in said valve body at the opposite end, and a rubber valve ball mounted in said casing body and adapted in one position to rest on said air escape pipe to close the same and adapted to rest against said other valve seat in its other position to open said air escape pipe, said ball allowing passage of air therearound through said valve body in its air escape pipe sealing position.

8. In sand blast tank mechanism, the combination of a pressure tank, a main valve for controlling the pressure in said tank, a connecting air pipe from said valve to said tank, and means in said pipe to divert the stream of fluid issuing from said tank when said valve is moved to tank pressure releasing position, and to prevent said stream from passing through said valve.

9. A multiway check valve comprising a casing provided with a longitudinal bore, a bored projection extending into said bore intermediate the ends thereof, a valve seat at one end of said longitudinal bore, a valve seat at the inner end of said projection, and a valve member in said casing and adapted to seat alternately on either of said seats.

10. A multiway check valve comprising a casing provided with a longitudinal bore, a bored projection extending into said bore intermediate the ends thereof, the inner end of said projection being formed as a valve seat, a false seat extending into said longitudinal bore at a point opposite said projection, a valve seat at one end of said longitudinal bore, and a valve member in said casing and adapted to seat selectively on said last-named seat to seal said end of said longitudinal bore, or on said projection valve seat and against said false seat to seal said projection bore.

11. A multiway check valve comprising a casing provided with a longitudinal bore, a valve seat at one end of said bore, a bored projection extending into said bore at a point intermediate the ends thereof, said projection being inclined toward said valve seat and being formed at its inner end as a valve seat, and a valve member in said casing and adapted to seat alternately on said seats.

12. A multiway check valve comprising a casing provided with a longitudinal bore, a bored projection extending into said bore intermediate the ends thereof, the inner end of said projection being formed as a valve seat, a false seat extending into said longitudinal bore at a point opposite said projection, a valve seat at one end of said longitudinal bore, and a valve member in said casing and adapted to seat selectively on said last-named seat to seal said end of said longitudinal bore, or on said projection valve seat and against said false seat to seal said projection bore, said projection and said false seat being dimensioned to permit a flow of fluid through said longitudinal bore around said valve when the latter is seated on said projection valve seat and against said false seat.

Signed by me this 31st day of March, 1927.

GEORGE A. BOESGER.